United States Patent
Jiang et al.

(10) Patent No.: US 11,231,980 B1
(45) Date of Patent: Jan. 25, 2022

(54) METHOD, DEVICE AND SYSTEM FOR FAULT DETECTION

(71) Applicant: Zhejiang Gongshang University, Hangzhou (CN)

(72) Inventors: Xiaoning Jiang, Hangzhou (CN); Zhendong Yu, Hangzhou (CN); Jiahao Yao, Hangzhou (CN); Kelei Jiang, Hangzhou (CN); Fengqing Zhang, Hangzhou (CN); Hongmin Xie, Hangzhou (CN); Kai Liu, Hangzhou (CN); Jian Fang, Hangzhou (CN); Jia'nan Qi, Hangzhou (CN); Yuhan Zhou, Hangzhou (CN)

(73) Assignee: Zhejiang Gongshang University, Hangzhou (CN)

( * ) Notice: Subject to any disclaimer, the term of this patent is extended or adjusted under 35 U.S.C. 154(b) by 0 days.

(21) Appl. No.: 17/196,343

(22) Filed: Mar. 9, 2021

(30) Foreign Application Priority Data

Oct. 29, 2020 (CN) .......................... 202011180817.3
Jan. 22, 2021 (CN) .......................... 202110088767.4

(51) Int. Cl.
*G06F 11/00* (2006.01)
*G06K 9/00* (2006.01)
(Continued)

(52) U.S. Cl.
CPC ........ *G06F 11/0751* (2013.01); *G06K 9/6256* (2013.01); *G06K 9/6269* (2013.01);
(Continued)

(58) Field of Classification Search
None
See application file for complete search history.

(56) References Cited

U.S. PATENT DOCUMENTS

| | | | |
|---|---|---|---|
| 5,805,981 A * | 9/1998 | Sugio .................... | G08B 5/226 340/7.56 |
| 2011/0280470 A1* | 11/2011 | Hayashi ............. | G01N 21/9505 382/149 |

(Continued)

OTHER PUBLICATIONS

Jiahao, Yao, et al. "SVM-BiLSTM: A Fault Detection Method for the Gas Station IoT System Based on Deep Learning." IEEE Access 8 (2020): 203712-203723. (Year: 2020).*

*Primary Examiner* — Sean M Conner
(74) *Attorney, Agent, or Firm* — Schwegman Lundberg & Woessner, P.A.

(57) ABSTRACT

The disclosure provides a method, a device and a system for fault detection. The fault detection method includes following steps: acquiring interactive data generated during a working process of a target Internet of Things system, and generating data to be detected based on the interactive data; detecting whether the data to be detected is fault data or not, and performing an emotion analysis on the data to be detected which is judged as the fault data to obtain a corresponding emotion label; and extracting a corresponding fault type from a preset fault emotion mapping table based on the emotion label and outputting the fault type. In this disclosure, the interactive data is analogized to human emotions, and the faults are accurately found through the emotional analysis on the data, thereby achieving the fault detection of the Internet of Things system in a convenient, flexible and accurate manner.

12 Claims, 7 Drawing Sheets

S100 — Interactive data generated during the working process of the target Internet of Things system is acquired and data to be detected is generated based on the interactive data S200 — It is detected whether the data to be detected is fault data or not, and an emotion analysis on the data to be detected which is judged as the fault data is performed to obtain a corresponding emotion label S300 — A corresponding fault type is extracted from a preset fault emotion mapping table based on the emotion label and outputted

(51) Int. Cl.
    *G06F 11/07*   (2006.01)
    *G16Y 40/10*   (2020.01)
    *G06K 9/62*    (2006.01)
    *G16Y 20/20*   (2020.01)
    *G16Y 40/20*   (2020.01)

(52) U.S. Cl.
    CPC .............. *G16Y 20/20* (2020.01); *G16Y 40/10* (2020.01); *G16Y 40/20* (2020.01)

(56) References Cited

U.S. PATENT DOCUMENTS

| | | | |
|---|---|---|---|
| 2015/0100537 A1* | 4/2015 | Grieves | G06F 3/0236 706/52 |
| 2018/0309703 A1* | 10/2018 | Ihara | H04L 51/10 |
| 2020/0012457 A1* | 1/2020 | Ota | G06F 11/079 |
| 2020/0304648 A1* | 9/2020 | Abe | H04N 1/00076 |

* cited by examiner 2019-10-18 15:00:01 >01FDFF4D0019501920101800055500011111150101130000004E55A
2019-10-18 15:00:01 >02FDFF4500195019201810000555000111111150101130000048803
2019-10-18 15:00:01 >
FFFD024500475001020301FE000099070005349805400000000111101000004A9D87C00001B12000005D9000007BC0000112920
010D61
2019-10-18 15:00:01 >
FFFD014D004750010101301C2000000000007569705400000000111111010000001EAA7B4000000E58000010900000019C0000049820
0199EC
2019-10-18 15:00:01 >01FDFF4E0019501920101800056000111111150101130000004924B
2019-10-18 15:00:01 >02FDFF4600195019201810000560000111111150101130000004FF12

FIG. 4(A)

2019-10-18 00:03:05 >
FDFF02570162520000344072019191018000356201910180003560947000000000000009015130000000000000000000000
00000000000000000000000000000000000000000000000000000000000000000000000004A9D87C001A8719B0000021C030400000000000000000000003
44000024770000000000000F5E
2019-10-18 00:03:05 >
FDFF02570162520111135897896514785748889936654F5EE00000000000000000000000000000000000000000000000
00000000000000000022001000000000004A9D87C001A8719B0000021C030400000000000000000000034400002477000000
00000000F7D5AA
2019-10-18 00:03:05 >
FDFF02570162520000344072019191018000356094700000000000000000000000000000000000000000000000000000000
000000000000000000000000000000000000000000000000000000000022001000000000004A9D87C001A8719B0000021C030400
2019-10-18 00:03:05 >

FIG. 4(B)

```
090000EE01B679AC8E
52080000EE0A46266305
13300000365209000EE01B679536A
094600023100063D
070000EE0C675720F4
01000413300000365208000EE0A4626F658
3652090000EE01B679C637
070000EE0C6757B5A9
9FAB27
00007F000013029F7104
31007055
00A154
```

FIG. 4(C)

```
303030303031313131313131313131303030
4140424435353362A3D4B676898754213457
445212035364AA22AAAAD4DD5D6B4BDFE
37373839424150
3030303030313131313131313131313030304455212035336
8995321642357625800130303031313131313131
4140424435353674AABFC29D77514D67
30303030303131313131313131313030303030303031313131313131313131313030303030
AABFC29D77514D675EF39AB2225819892836754287
AABFC29D77514D67
```

FIG. 4(D)

2019-10-20 12:06:09>
FDFF000000082000000000000007201910180003560947000000000000000000000000000000000000000000000000000000000000000000000000000000000000000000000000000000000000000000000000000000000000000000000000000000000000000000000004A9D87C001A8719B000000021C0304000000000000000000000000000000000000000000000000000000000000000000000000000000000000000F5E 2019-10-20 12:06:09>
FDFF000000082000000000000007201910180003560947000000000000000000000000000000000000000000000000000000000000000000000000000000000000000000000000000000000000000000000000000000000000000000000000000000000000000002201000000000000004A9D87C001A8719B000000021C0304000000000000000000000000000000000000000000000000000000000000000000000000000000000000000F5E 2019-10-20 12:06:09>
FDFF000000082000000000000007201910180003560947000000000000000000000000000000000000000000000000000000000000000000000000000000000000000000000000000000000000000000000000000000000000000000000000000000000000000002201000000000000004A9D87C001A8719B000000021C0304000000000000000000000000000000000000000000000000000000000000000000000000000000000000000F5E 2019-10-20 12:06:09>
FDFF000000082000000000000007201910180003560947000000000000000000000000000000000000000000000000000000000000000000000000000000000000000000000000000000000000000000000000000000000000000000000000000000000000000002201000000000000004A9D87C001A8719B000000021C0304000000000000000000000000000000000000000000000000000000000000000000000000000000000000000F5E

FIG. 4(E)

METHOD, DEVICE AND SYSTEM FOR FAULT DETECTION

CROSS REFERENCE TO RELATED APPLICATIONS

This application claims priority to and incorporates by reference Chinese patent application no. 202110088767.4 filed on 2021 Jan. 22 and Chinese patent application no. 202011180817.3 filed 2020 Nov. 13.

TECHNICAL FIELD

The disclosure relates to the field of machine fault detection, in particular to a technology for automatically detecting faults based on interactive data.

BACKGROUND ART

With an emergence of Industry 4.0 and proposal of Made in China 2025, the industry has entered an intelligent era. With intelligence reconstruction of production equipment in key intelligent manufacturing fields, the industrial equipment will eventually be upgraded to be a large-scale one with intelligent integration and to be of a more complex structure. At the same time, reliability and safety in an intelligent mechanical equipment production must be taken into account, and condition monitoring and maintenance methods of various equipment in a corresponding Internet of Things system should be upgraded.

Currently in a traditional industry, two ways are mainly adopted to manage the industrial equipment system, that is, the Internet of Things system:

1. checking the equipment by a worker daily. However, because an ordinary worker don't know details about an equipment structure and internal conditions, they can only check obvious faults such as loose lines, which adds extra work to the workers, but can't guarantee safety and stability of the equipment, resulting in a low maintenance efficiency.

2. sending professional maintenance personnel from relevant management companies to repair faults. This solution is suitable for fault detection and maintenance of the Internet of Things system by the professional maintenance personnel in site after the faults have occurred in the Internet of Things system, but because the maintenance personnel often cannot arrive at the site quickly, an increased downtime and increased losses of the factory are caused.

SUMMARY

In view of drawbacks in a prior Internet of Things system such as requiring a large amount of efforts, the disclosure provides a technology capable of automatically detecting faults based on interactive data.

In order to solve the above technical problems, the present disclosure provides following technical solutions.

A fault detection method includes following steps:

acquiring interactive data generated during a working process of a target Internet of Things system, and generating data to be detected based on the interactive data, in which a person skilled in the art can independently select interactive logs corresponding to key devices in the target Internet of Things system as the interactive data;

detecting whether the data to be detected is fault data or not, and performing an emotion analysis on the data to be detected which is judged as the fault data to obtain a corresponding emotion label; and extracting a corresponding fault type from a preset fault emotion mapping table based on the emotion label and outputting the fault type.

As a possible implementation, the detecting whether the data to be detected is the fault data is made based on a pre-built fault detection model, and the emotion analysis is performed on the data to be detected which is judged as the fault data to obtain the corresponding emotion label, and a method for constructing the fault detection model includes following steps:

collecting the interactive data generated during the working process of the Internet of things system, and generating a plurality of pieces of sample data based on the interactive data;

marking each of the pieces of sample data with a fault label to generate corresponding first training data, the fault label being normal or abnormal;

extracting sample data with abnormal fault labels, marking the sample data with emotion labels and generating corresponding second training data;

training based on the first training data to obtain the detection model, the detection model being configured for identifying whether the input data to be detected is fault data or not;

training based on the second training data to obtain an emotion analysis model, the emotion analysis model being configured for identifying an emotion type of the input data to be detected; and generating the fault detection model based on the detection model and the emotion analysis model.

As a possible implementation:

the detection model adopts a SVM model, the emotion analysis model adopts a BiLSTM model, and the fault detection model is a SVM-BiLSTM model.

As a possible implementation:

the data to be detected and the sample data are both digital data.

As an implementable method, the method of converting the interactive data into corresponding digital data, that is, converting the interactive data into the data to be detected, or converting the interactive data into the sample data, specifically includes following steps:

acquiring a pre-constructed index table, the index table including a plurality of words (character strings) and numbers corresponding to the words in one-to-one correspondence;

performing a word segmentation on the interactive data to obtain a plurality of word segmentation results;

matching each of the word segmentation results with each word in the index table, extracting numbers corresponding to successfully matched words, and generating the corresponding digital data.

The disclosure also provides a fault detection device for collecting interactive data generated during a working process of an Internet of things system. The fault detection device includes:

an acquisition module, configured for collecting the interactive data generated during the working process of the target Internet of Things system and generating data to be detected based on the interactive data;

a detection module, configured for detecting whether the data to be detected is fault data or not, and performing an emotion analysis on the data to be detected which is judged as the fault data to obtain a corresponding emotion label; and an output module, configured for extracting a corresponding fault type from a preset fault emotion mapping table based on the emotion label and outputting the fault type.

As a possible implementation, it also includes a model constructing module. The model constructing module includes:

a sample acquisition unit, configured for collecting the interactive data generated during the working process of the Internet of things system, and generating a plurality of pieces of sample data based on the interactive data;

a first marking unit, configured for marking each of the pieces of sample data with a fault label to generate corresponding first training data, the fault label being normal or abnormal;

a second marking unit, configured for extracting sample data with abnormal fault labels, marking the sample data with emotion labels and generating corresponding second training data;

a first constructing unit, configured for training based on the first training data to obtain the detection model, the detection model being configured for identifying whether the input data to be detected is fault data or not;

a second constructing unit, configured for training based on the second training data to obtain an emotion analysis model, the emotion analysis model being configured for identifying an emotion type of the input data to be detected; and a model output unit, configured for generating the fault detection model based on the detection model and the emotion analysis model.

The disclosure also provides a fault detection system, which includes:

an Internet of Things system;

an Internet of Things gateway coupled with an Internet of Things system signal and configured for collecting interactive data generated during a working process of the Internet of Things system;

a cloud device coupled with the Internet of Things gateway signal, configured for receiving the interactive data collected by the Internet of Things gateway, and further for executing the fault detection method according to any one of claims 1 to 5.

As a possible implementation, the Internet of Things system includes a oiling machine, a payment terminal, an oil tank and an edge server. The payment terminal, the oil tank and the edge server are all coupled with the Internet of Things gateway signal, and the payment terminal is also coupled with a oiling machine signal.

The disclosure also provides a computer-readable storage medium having computer program stored thereon which, when executed by a processor, realizes steps of any one of the above methods.

With the above technical scheme, the disclosure presents obvious technical effects as follows Since different faults lead to different changes of the interactive data, in the present disclosure the interactive data is analogized to human emotion and the faults are accurately found through an emotion analysis on the data, so that the fault detection of the Internet of Things system is made in a convenient, flexible and accurate manner, and defects of difficult daily maintenance of key equipment, inability to quickly locate the faults during the downtime and the like in the existing Internet of Things system can be addressed without upgrading of original equipment and without checking the equipment by the worker daily and manually, and the fault types can be automatically and quickly identified with the interactive data, which greatly reduces maintenance cost and effectively improves detection efficiency.

BRIEF DESCRIPTION OF THE DRAWINGS

In order to explain the embodiments of the present disclosure or the technical scheme in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

FIG. 4 is a schematic diagram of module connection of a fault detection system for a gas station.

DETAILED DESCRIPTION

The present disclosure will be further described in detail with reference to the following examples which present explanation the present disclosure and the present disclosure is not limited to the following examples.

Figure 1:
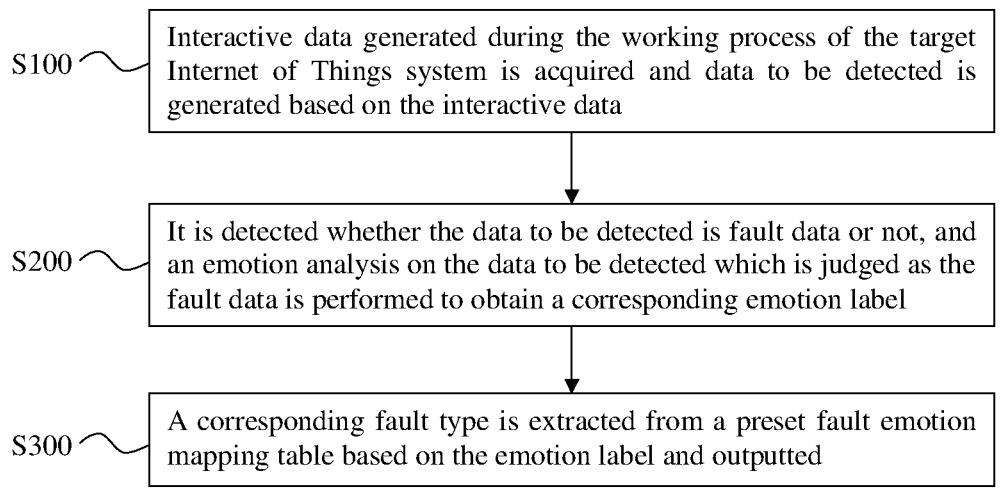
FIG. 1 is a flow diagram of a fault detection method according to the present disclosure.

Embodiment 1: a fault detection method, as shown in FIG. 1, includes following steps S100 to S300.

In S100, interactive data generated during the working process of the target Internet of Things system is acquired and data to be detected is generated based on the interactive data.

The interaction data can be historical interaction data or current interaction data.

The fault detection can be made based on the historical interactive data, so that abnormal interactive data can be accurately located when the faults occur, for a subsequent fault analysis.

The fault detection can be made in real time based on the current interactive data and a fault type can be identified based on the abnormal interactive data generated when the target Internet of Things system fails, thus improving the efficiency of the fault detection and facilitating troubleshooting by workers.

In S200, it is detected whether the data to be detected is fault data or not, and an emotion analysis on the data to be detected which is judged as the fault data is performed to obtain a corresponding emotion label.

The target Internet of Things system consists of a plurality of devices, and the interactive data is the data generated by the interaction between the plurality of devices during the working process, and thus when the target Internet of Things system fails, the interactive data corresponding to the related devices will change.

The abnormal interactive data can be analogized to human emotions according to an actual situation by those skilled in the art. In an actual detection process, the emotion expressed by the fault data can be obtained by the emotion analysis on the data to be detected. For example, when a few bytes of data in fault data are exchanged, it can be analogized to an emotion of sadness.

When the fault data is truncated data which is obviously shortened, it can be analogized to an emotion of depression.

When the fault data is chaotic, it can be analogized to an emotion of worrying;

In S300, a corresponding fault type is extracted from a preset fault emotion mapping table based on the emotion label and outputted.

Because different faults cause different changes in interactive data and thus different expressed emotions, the fault type mapped to the emotion can be extracted based on the emotion label so as to achieve a purpose of fault detecting.

In this embodiment, the interactive data is analogized to human emotions, and the faults are accurately found through the emotional analysis on the data, thereby achieving the fault detection of the Internet of Things system 10 in a convenient, flexible and accurate manner.

Further, the above step S200 is executed based on a pre-built fault detection model, and a method for constructing the fault detection model includes following steps.

(1) The interactive data generated during the working process of the Internet of things system 10 are collected, and a plurality of pieces of sample data are generated based on the interactive data.

The above-mentioned Internet of Things system 10 may include the target Internet of Things system.

The interactive data is text data (hexadecimal), while the data used in deep learning and machine learning are both digital (decimal), and thus the data to be detected and the sample data in this embodiment are both digital data.

(2) Each of the pieces of sample data is marked with a fault label to generate corresponding first training data, the fault label being normal or abnormal.

(3) Sample data with abnormal fault labels are extracted and marked with emotion labels, and corresponding second training data is generated.

(4) A training is made based on the first training data obtained in step (2) to obtain the detection model, the detection model being configured for identifying whether the input data to be detected is fault data or not.

In this embodiment, the detection model adopts a SVM (Support Vector Machine) model, with its input of the detection model being the data to be detected and its output being the fault label (normal/abnormal) corresponding to the data to be detected, the fault label being used to detect whether the data to be detected is abnormal.

The feature extraction of the SVM model is more obvious, with a fast calculation speed and a high accuracy.

(5) a training is made based on the second training data to obtain an emotion analysis model, the emotion analysis model being configured for identifying an emotion type of the input data to be detected.

In this embodiment, the emotion analysis model adopts a BiLSTM model, with its input being the fault data and its output being the emotion label corresponding to the fault data, the emotion label being used to identify the emotion expressed by the fault data.

(6) The fault detection model is generated based on the detection model and the emotion analysis model.

The fault detection model constructed in this embodiment is a SVM-BiLSTM model.

Shallow features of the sample data are obvious with a less strong correlation, and a proportion of the sample data with abnormal fault labels is relatively small, and thus it takes a long time to train the BiLSTM model directly with the sample data, and the BiLSTM model is required to use LSTM for forward and reverse computing, which greatly increases its computing time.

In this embodiment, the shallow features of the data to be detected are extracted through the SVM model, and the BiLSTM model only identifies the fault type, so that data amount in the BiLSTM model training and the data amount to be detected are reduced, and time for a model construction and the fault detection can be greatly reduced while specific faults are accurately determined.

during the detection, the data to be detected is input into the SVM model, and the SVM model outputs the fault label (normal or abnormal) of the data to be detected.

When the fault label is normal, the detection result is outputted as no fault and the detection ends.

And when the fault label is abnormal, the data to be detected is input as the fault data into the BiLSTM model, the emotion label corresponding to the data to be detected is outputted by the BiLSTM model, the corresponding fault type is extracted from a preset fault emotion mapping table based on the emotion label, the detection result is outputted as a machine fault, and the corresponding fault data and the fault type are fed back.

Note: The above SVM model and BiLSTM model are both existing known models. With the adopted training data knowned, the skilled in the art can train the models according to a conventional training scheme, so that the obtained SVM model can only need to classify the data to be detected and identify whether the data to be detected is normal or abnormal; and so that the obtained BiLSTM model can perform an emotion analysis on the fault data to identify the expressed emotion.

The method of converting the collected interactive data into the sample data during the training is the same as that of converting the collected interactive data into the data to be detected during the detection. Therefore, in this embodiment, only the method of converting the collected interactive data into the data to be detected during detection is introduced in detail, which includes following steps S110 to S130.

In S110, a pre-constructed index table is acquired, the index table including a plurality of words and numbers corresponding to the words in one-to-one correspondence.

Those skilled in the art can build their own index table according to the interactive data generated by the target Internet of Things system.

When the device interacts, it generates corresponding message according to a corresponding communication protocol. Therefore, in this embodiment, a word library is constructed based on the communication protocol, and each character string in the word library is mapped with numbers to obtain an index table.

In S120, a word segmentation is performed on the interactive data to obtain a plurality of word segmentation results.

In this embodiment, based on the word library, a Jieba word segmenter is used to segment the interactive data to obtain the corresponding word segmentation results, that is, the character strings.

In S130, each of the word segmentation results is matched with each word in the index table, numbers corresponding to successfully matched words are extracted, and the corresponding digital data is generated.

Furthermore, before the interactive data is segmented in step S120, a data cleaning step is also included.

In this embodiment, null data and abnormal data with special symbols in the interactive data are deleted to realize the data cleaning, and the word segmentation is performed on the cleaned interactive data.

Further, in step S130, the extracting of the numbers corresponding to the successfully matched words to generate the corresponding digital data is specifically as follows.

That is, the character strings obtained by the word segmentation in step S120 are matched with the words in the pre-built index table, and the numbers corresponding to the successfully matched words are extracted instead of respective character strings to generate converted data;

the converted data are supplementally processed (using 0 pad token) based on the preset data length to obtain supplementary data. In this embodiment, in view of problems of data missing, data inconsistence, different data lengths and the like, the data is converted to be with a same length by a design of data supplementing, for a subsequent training or detecting.

The supplementary data is normalized to obtain the digital data. In this embodiment, the supplementary data is converted from high dimension to low dimension through the normalizing. An idea of the data normalizing is to scale the data using a corresponding algorithm so that it is in a specific interval. The model is trained based on the normalized data (the sample data) to make the model have a faster convergence speed and to improve the training accuracy at the same time.

Furthermore, after the corresponding fault type is extracted from the preset fault emotion mapping table based on the emotion label and outputted in step S300, it also includes a fault feedback step as follows.

The detected fault types are summarized and analyzed according to a preset analysis rule to obtain analysis results.

Visual data can be generated and displayed based on the analysis results.

In this embodiment, after the detection results (fault types) are obtained, not only the detection results are fed back to corresponding workers, but also the detection results are summarized and analyzed based on the preset analysis rule, and the analysis results are displayed in a form of chart, so as to facilitate the data analysis by the workers.

Those skilled in the art can specify their own analysis rules according to actual needs, for example, statistic categorize the fault types of the same target Internet of Things system on a monthly basis, so as to reflect the fault types and corresponding times of the target Internet of Things system in one month, so as to maintain the target Internet of Things system in a targeted manner.

Embodiment 2: A fault detection device includes:

an acquisition module, configured for acquiring interactive data generated during the working process of the target Internet of Things system and generating data to be detected based on the interactive data;

a detection module, configured for detecting whether the data to be detected is fault data or not, and performing an emotion analysis on the data to be detected which is judged as the fault data to obtain a corresponding emotion label; and an output module, configured for extracting a corresponding fault type from a preset fault emotion mapping table based on the emotion label and outputting the fault type.

Further, it also includes a model constructing module. The model constructing module includes:

a sample acquisition unit, configured for collecting the interactive data generated during the working process of the Internet of things system 10, and generating a plurality of pieces of sample data based on the interactive data;

a first marking unit, configured for marking each of the pieces of sample data with a fault label to generate corresponding first training data, the fault label being normal or abnormal;

a second marking unit, configured for extracting sample data with abnormal fault labels, marking the sample data with emotion labels and generating corresponding second training data;

a first constructing unit, configured for training based on the first training data to obtain the detection model, the detection model being configured for identifying whether the input data to be detected is fault data or not;

a second constructing unit, configured for training based on the second training data to obtain an emotion analysis model, the emotion analysis model being configured for identifying an emotion type of the input data to be detected; and a model output unit, configured for generating the fault detection model based on the detection model and the emotion analysis model.

Further, the acquisition module includes: an index table acquisition unit, for acquiring a pre-constructed index table, the index table including a plurality of words and numbers corresponding to the words in one-to-one correspondence;

a word segmentation unit, for performing a word segmentation on the interactive data to obtain a plurality of word segmentation results; and a conversion unit for matching each of the word segmentation results with each word in the index table, extracting numbers corresponding to successfully matched words, and generating the corresponding digital data.

This embodiment is a device embodiment corresponding to Embodiment 1. It is basically similar to Embodiment 1, and description thereof is relatively simple. Reference can be made to the description of the method embodiment for relevant aspects.

Figure 2:
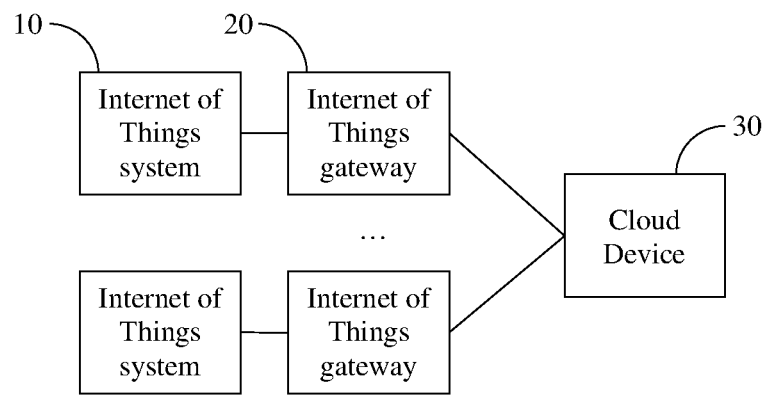
FIG. 2 is a schematic diagram of module connection of a fault detection system according to the present disclosure.

Embodiment 3: a fault detection system, as shown in FIG. 2, includes:

At least one Internet of Things system 10;

Internet of Things gateways 20 with a number consistent with that of the at least one Internet of Things system 10, the Internet of Things systems 10 being connected with the Internet of Things gateways 20 in one-to-one correspondence, each of the Internet of Things gateways 20 being configured to collect interactive data generated during a working process of the Internet of Things system 10 coupled with its signal, and the Internet of Things gateways 20 collect data in second, which can fully reflect a real-time situation of the entire Internet of Things system 10;

a cloud device 30 coupled with each of the Internet of Things gateways 20, for receiving the interactive data collected by the Internet of Things gateway 20 and further for executing the fault detection method described in Embodiment 1.

The Internet of Things system 10 uploads the interactive data generated during its working process to the Internet of Things gateway 20, the Internet of Things gateway 20 reports the received interactive data to the cloud device 30 based on MQTT technology, the cloud device 30 performs the fault detection, and the cloud feeds back the fault detection results to relevant workers.

Those skilled in the art can perform the fault detection on the Internet of Things system 10 in different industrial scenarios according to actual needs, for example, the fault detection on a gas station Internet of Things system 10 in this embodiment.

It also includes a fault detection device for acquiring corresponding fault detection results (fault types and fault data) from the cloud device 30, and visually processing the fault detection results so as to display to relevant workers.

Figure 3:
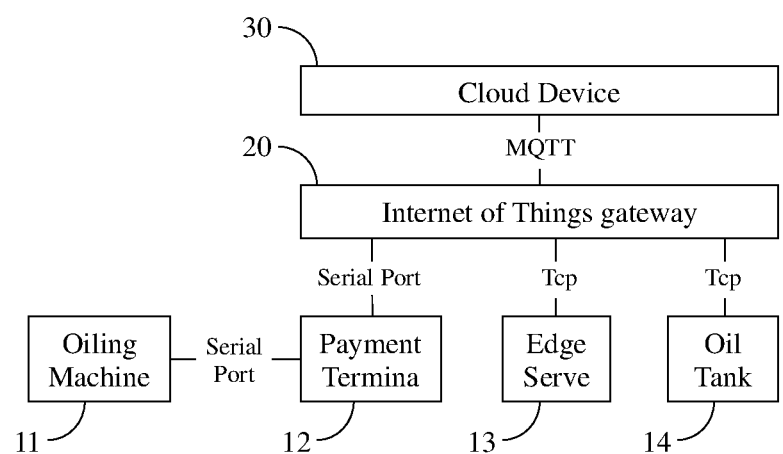
FIG. 3 is a schematic diagram of module connection of a fault detection system for a gas station.

Referring to FIG. 3, the gas station Internet of things system 10 includes:

At least one oiling machine 11 (OM), which is a most important data source in the entire Internet of things system 10;

payment terminals 12 (EPOS) with a number same as that of the oiling machines 11, connected with the oiling machines 11 in one-to-one correspondence and configured to send oiling instructions (oiling amount or oiling sum) to the oiling machines 11, in which in this embodiment, the payment terminals 12 are in full duplex communication with the oiling machines 11 through serial ports, and each of the payment terminals 12 is in full duplex communication with the Internet of things gateway 20 through serial ports;

at least one oil tank 14 (OT), each of which is in full duplex communication with the internet of things gateway 20 through TCP (transmission control protocol) for transmitting a remaining volume in the oil tank 14;

an edge server 13(ES), configured for performing a full duplex communication with the Internet of things gateway 20 through the TCP.

The Internet of Things gateway 20 (EIOTG) collects interaction logs as interactive data through serial ports and with the TCP protocol, including data communicated by the payment terminal 12 with the oiling machine 11, data communicated by the oiling machine 11 with the edge server 13 and data reported by the oil tank 14.

In this embodiment:

The payment terminal 12 sends communication data between the payment terminal 12 and the oiling machine 11 to the Internet of Things gateway 20, and the Internet of Things gateway 20 uploads the data to the cloud device 30 through MQTT.

The oiling machine 11 communicates with the edge server 13 through the payment terminal 12 and the Internet of Things gateway 20. The payment terminal 12 and the edge server 13 can't communicate with each other directly due to limitations of the device and the protocol. Therefore, the Internet of Things gateway 20 is required to perform a forwarding. In an actual working process, the oiling machine 11 sends its information (hexadecimal) to the Internet of Things gateway 20 through the payment terminal 12, which is then forwarded to the edge server 13 by the Internet of Things gateway 20. The edge server 13 returns corresponding response data to the oiling machine 11 through the Internet of Things gateway 20 and the payment terminal 12 according to the received information. The Internet of Things gateway 20 uploads the data received in the above process to the cloud device 30 through the MQTT.

The oil tank 14 transmits the volume data of its remaining oil to the Internet of Things gateway 20 through the TCP, which is then uploaded by the Internet of Things gateway 20 to the cloud device 30 through the MQTT.

Taking the above-mentioned gas station Internet of Things system 10 as the target Internet of Things system for the fault detection, the fault emotion mapping table of this embodiment is shown in the following table.

TABLE 1

| Fault Number | Fault Name | One-hot Code | Emotion |
|---|---|---|---|
| 0 | noise fault of serial ports of the oiling machine | 10000 | sadness |
| 1 | EPOS overload fault of serial ports | 01000 | decadent |
| 2 | EPOS insufficient power supply abnormality for a storage module | 00100 | anger |
| 3 | ES memory leak | 00010 | annoyance |
| 4 | Blacklist issuing fault | 00001 | hating |

The oiling machine in the above table indicates the oiling machine 11, and in this embodiment, different error types are mapped to a kind of human emotion one by one, with one-hot code as the corresponding emotion label.

Reference is made to FIG. 4 which is abnormal interaction data generated when the above five faults occur.

As shown in (A) of FIG. 4, in a case of a noise fault of the serial ports of the oiling machine 11, a data sequence will be disturbed at an unknown position, thereby presenting some bytes of data being exchanged, for example, FD01 is transformed to be 01FD, which is mapped to an emotion of sadness in this embodiment.

As shown in (B) of FIG. 4, in a case of an overload fault of the serial ports of the payment terminal 12, the message will be truncated at different positions, thus presenting obviously shortened data, which is mapped to an emotion of decadence in this embodiment.

As shown in (C) of FIG. 4, when there is a power-on abnormality error for a storage module in the payment terminal 12, some data will be linked together, or some parts of the message will be spliced into ordinary messages, which is mapped to an emotion of anger in this embodiment.

As shown in (D) of FIG. 4, when the edge server 13 receives an error, the message will be displayed in a chaotic state, which is mapped to an emotion of annoyance in this embodiment.

As shown in (E) of FIG. 4, when the oiling machine 11 fails to obtain the blacklist, its blacklist data will be distributed all the time, thus occupying a normal data transmission, and resulting in a fault of normal businesses such as oiling, which is considered to be an emotion of hating in this embodiment.

Model Training:

Historical interactive data of the Internet of Things system 10 of each gas station is collected, the sample data is obtained after a data cleaning and a data conversion, and then the training model is made according to the model construction steps disclosed in Embodiment 1. That is, referring to FIG. 5, the SVM model is trained with the sample data with normal and abnormal labels, and the sample data with abnormal labels (the fault data) is marked with corresponding emotional labels, so as to obtain the training data with emotional labels (abnormal data); and then the BiLSTM model is trained with this training data. Finally a SVM-BiLSTM model is obtained.

In this embodiment, an accuracy of the SVM-BiLSTM model is as high as 99.12%, with computing time of 1733.12s.

If the SVM model is removed, and no fault is mapped to an emotion of happiness, that is, there are six emotion labels, and the BiLSTM model is trained by using the sample data (normal data and fault data) labeled with six emotion labels, and the obtained BiLSTM model is used as the fault detection model. The accuracy of the BiLSTM model is 99.93%, with computing time up to 11000.71s. Therefore, compared with the BiLSTM model, the SVM-BiLSTM model provided in this embodiment only sacrifices 0.8% accuracy, but with a greatly improved computing speed and a effectively improved fault detection efficiency.

Fault Detection:

The cloud device 30 receives the current interactive data (real-time data) issued by the Internet of Things gateway 20 through the MQTT, and obtains the data to be detected after the data cleaning and data conversion.

Figure 5:
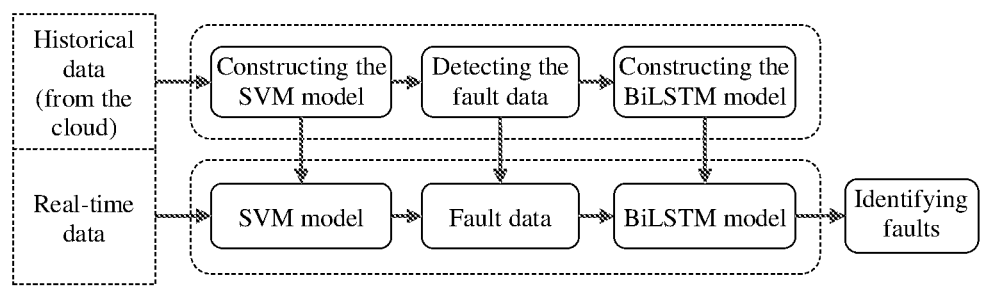
FIG. 5 is a schematic diagram of abnormal interactive data.

With reference to FIG. 5, the data to be detected is input into the SVM-BiLSTM model obtained by the above training, and the shallow features of the data to be detected are extracted and classified by the SVM model in the SVM-BiLSTM model. The BiLSTM model performs the emotion analysis on the data to be detected (fault data) which is classified to be abnormal, so as to identify the emotion expressed by the data to be detected.

When the SVM-BiLSTM model outputs the emotional label, the fault type corresponding to the emotional label is extracted and informed to the corresponding user, and further the visualization processing can be performed according to actual needs, and a corresponding chart can be generated for further analysis on the fault.

It can be seen from the above that, when the fault detection method proposed in Embodiment 1 is applied to the gas station, a defect of huge economic losses in the gas station caused by difficult daily maintenance of key equipment, inability to quickly locate the faults during the downtime can be addressed, without upgrading of original equipment and without checking the equipment by the worker daily and manually, and the fault types can be automatically and quickly identified with the interactive data so as to carry out targeted maintenance and repair, which greatly reduces maintenance cost and effectively improves detection efficiency.

Embodiment 4: a computer-readable storage medium having computer program stored thereon which, when executed by a processor, realizes steps of the method described in Embodiment 1.

All the embodiments in this specification are described in a progressive way, and each embodiment focuses on differences from other embodiments. The same and similar parts among the embodiments can be referred to each other.

It should be understood by those skilled in the art that embodiments of the present disclosure may be provided as a method, an device, or a computer program product. Therefore, the present disclosure may be implemented in an entire hardware embodiment, an entire software embodiment, or an embodiment combining the software and the hardware. Furthermore, the present disclosure may be implemented in the form of a computer program product embodied on one or more computer usable storage media (including but not limited to disk memory, CD-ROM, optical memory, etc.) having computer usable program code contained therein.

The present disclosure is described with reference to a flowchart and/or block diagram of a method, a terminal device (system), and a computer program product according to the present disclosure. It should be understood that each flow and/or block in the flowchart and/or block diagram, or a combination of flows and/or blocks in the flowchart and/or block diagram can be implemented with computer program instructions. These computer program instructions can be provided to a processor of a general purpose computer, a special purpose computer, an embedded processor or other programmable data processing terminal device to produce a machine, so that the instructions executed by the processor of the computer or other programmable data processing terminal device produce means for implementing the functions specified in one or more flows in the flowchart and/or in one or more blocks in block diagram.

These computer program instructions can also be stored in a computer-readable memory that can guide a computer or other programmable data processing terminal device to work in a specific way, so that the instructions stored in the computer-readable memory produce an article of manufacture including instruction means that implements the functions specified in one or more flows in the flowchart and/or in one or more blocks in the block diagram.

These computer program instructions can also be loaded on a computer or other programmable data processing terminal device, so that a series of operation steps are executed on the computer or other programmable terminal device to produce computer-implemented processing, so that the instructions executed on the computer or other programmable terminal device provide steps for implementing functions specified in one or more flows in the flowchart and/or in one or more blocks in block diagrams.

It should be noted that:

Reference to "one embodiment" or "an embodiment" in the specification means that a specific feature, structure or characteristic described in connection with embodiments is included in at least one embodiment of the present disclosure. Therefore, the phrases "one embodiment" or "an embodiment" appearing in various places throughout the specification do not necessarily refer to the same embodiment.

Although the preferred embodiments of the present disclosure have been described, additional changes and modifications can be made to these embodiments by those skilled in the art once basic inventive concepts are known. Therefore, the appended claims are intended to be interpreted as including the preferred embodiments and all changes and modifications falling within the scope of the present disclosure.

In addition, it should be noted that the specific embodiments described in this specification may have different shapes, names or the like of parts and components. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

What is claimed is:

1. A fault detection method, comprising following steps:
    acquiring interactive data generated during a working process of a target Internet of Things system and generating data to be detected based on the interactive data;
    detecting whether the data to be detected is fault data or not, and performing an emotion analysis on the data to be detected which is judged as the fault data to obtain a corresponding emotion label; and
    extracting a corresponding fault type from a preset fault emotion mapping table based on the emotion label and outputting the fault type;
    wherein the detecting whether the data to be detected is the fault data is made based on a pre-built fault detection model, and the emotion analysis is performed on the data to be detected which is judged as the fault data to obtain the corresponding emotion label, and a method for constructing the fault detection model comprises following steps:
    collecting the interactive data generated during the working process of the Internet of things system, and generating a plurality of pieces of sample data based on the interactive data;
    marking each of the pieces of sample data with a fault label to generate corresponding first training data, the fault label being normal or abnormal;
    extracting sample data with abnormal fault labels, marking the sample data with emotion labels and generating corresponding second training data;

training based on the first training data to obtain the detection model, the detection model being configured for identifying whether the input data to be detected is fault data or not;

training based on the second training data to obtain an emotion analysis model, the emotion analysis model being configured for identifying an emotion type of the input data to be detected; and generating the fault detection model based on the detection model and the emotion analysis model.

2. The fault detection method according to claim 1, wherein the detection model adopts a SVM model.

3. The fault detection method according to claim 2, wherein the emotion analysis model adopts a BiLSTM model; and the fault detection model is a SVM-BiLSTM model.

4. The fault detection method according to claim 3, wherein the data to be detected and the sample data are both digital data.

5. The fault detection method according to claim 4, wherein the method of converting the interactive data into corresponding digital data comprises following steps:

acquiring a pre-constructed index table, the index table comprising a plurality of words and numbers corresponding to the words in one-to-one correspondence;

performing a word segmentation on the interactive data to obtain a plurality of word segmentation results;

matching each of the word segmentation results with each word in the index table, extracting numbers corresponding to successfully matched words, and generating the corresponding digital data.

6. The fault detection method according to claim 5, wherein the Internet of Things system comprises a oiling machine, a payment terminal, an oil tank and an edge server.

7. A fault detection device for collecting interactive data generated during a working process of an Internet of things system, comprising:

an acquisition module, configured for collecting the interactive data generated during the working process of a target Internet of Things system and generating data to be detected based on the interactive data;

a detection module, configured for detecting whether the data to be detected is fault data or not, and performing an emotion analysis on the data to be detected which is judged as the fault data to obtain a corresponding emotion label;

an output module, configured for extracting a corresponding fault type from a preset fault emotion mapping table based on the emotion label and outputting the fault type; and a model constructing module, wherein the model constructing module comprises a sample acquisition unit, configured for collecting the interactive data generated during the working process of the Internet of things system, and generating a plurality of pieces of sample data based on the interactive data;

a first marking unit, configured for marking each of the pieces of sample data with a fault label to generate corresponding first training data, the fault label being normal or abnormal;

a second marking unit, configured for extracting sample data with abnormal fault labels, marking the sample data with emotion labels and generating corresponding second training data;

a first constructing unit, configured for training based on the first training data to obtain the detection model, the detection model being configured for identifying whether the input data to be detected is fault data or not;

a second constructing unit, configured for training based on the second training data to obtain an emotion analysis model, the emotion analysis model being configured for identifying an emotion type of the input data to be detected; and a model output unit, configured for generating the fault detection model based on the detection model and the emotion analysis model.

8. The fault detection method according to claim 7, wherein the Internet of Things system comprises a oiling machine, a payment terminal, an oil tank and an edge server.

9. A fault detection system, comprising:

an Internet of Things system;

an Internet of Things gateway coupled with an Internet of Things system signal and configured for collecting interactive data generated during a working process of the Internet of Things system;

a cloud device coupled with the Internet of Things gateway signal, configured for receiving the interactive data collected by the Internet of Things gateway, and further for executing the fault detection method, wherein the fault detection method comprises:

acquiring interactive data generated during the working process of a target Internet of Things system and generating data to be detected based on the interactive data;

detecting whether the data to be detected is fault data or not, and performing an emotion analysis on the data to be detected which is judged as the fault data to obtain a corresponding emotion label; and extracting a corresponding fault type from a preset fault emotion mapping table based on the emotion label and outputting the fault type;

wherein the detecting whether the data to be detected is the fault data is made based on a pre-built fault detection model, and the emotion analysis is performed on the data to be detected which is judged as the fault data to obtain the corresponding emotion label, and a method for constructing the fault detection model comprises following steps:

collecting the interactive data generated during the working process of the Internet of things system, and generating a plurality of pieces of sample data based on the interactive data;

marking each of the pieces of sample data with a fault label to generate corresponding first training data, the fault label being normal or abnormal;

extracting sample data with abnormal fault labels, marking the sample data with emotion labels and generating corresponding second training data;

training based on the first training data to obtain the detection model, the detection model being configured for identifying whether the input data to be detected is fault data or not;

training based on the second training data to obtain an emotion analysis model, the emotion analysis model being configured for identifying an emotion type of the input data to be detected; and generating the fault detection model based on the detection model and the emotion analysis model.

10. The fault detection system according to claim 9, wherein the detection model adopts a SVM model.

11. The fault detection system according to claim 10, wherein the emotion analysis model adopts a BiLSTM model; and the fault detection model is a SVM-BiLSTM model.

12. The fault detection system according to claim 11, wherein the Internet of Things system comprises a oiling machine, a payment terminal, an oil tank and an edge server, the payment terminal, the oil tank and the edge server being all coupled with the Internet of Things gateway signal, and the payment terminal being also coupled with a oiling machine signal.

* * * * *